United States Patent [19]

Sawyer et al.

[11] Patent Number: 4,578,414

[45] Date of Patent: Mar. 25, 1986

[54] WETTABLE OLEFIN POLYMER FIBERS

[75] Inventors: Lawrence H. Sawyer; George W. Knight, both of Lake Jackson, Tex.

[73] Assignee: The Dow Chemical Company, Midland, Mich.

[21] Appl. No.: 703,077

[22] Filed: Feb. 19, 1985

Related U.S. Application Data

[63] Continuation-in-part of Ser. No. 581,397, Feb. 17, 1984, abandoned.

[51] Int. Cl.$^4$ .......................... C08K 5/10; C08K 5/11; C08L 91/00
[52] U.S. Cl. .................................. 524/310; 523/169; 524/313; 524/317; 524/375; 524/376
[58] Field of Search ............... 524/313, 375, 376, 310, 524/317; 523/169

[56] References Cited

U.S. PATENT DOCUMENTS 4,486,552 12/1984 Niemann .......................... 524/313

Primary Examiner—Joseph L. Schofer
Assistant Examiner—N. Sarofim
Attorney, Agent, or Firm—W. J. Lee

[57] ABSTRACT

Wettable fibers and/or filaments, especially those of fine denier, are prepared from olefin polymers, especially linear low density copolymer (LLDPE), by having incorporated into said olefin polymer at least one wetting agent of the group comprising (a) an alkoxylated alkyl phenol along with a mixed mono-, di-, and/or tri-glyceride, or (b) a polyoxalkylene fatty acid ester, or (c) a combination of (b) and any part of (a) above.

49 Claims, No Drawings

WETTABLE OLEFIN POLYMER FIBERS

CROSS-REFERENCE TO RELATED APPLICATION

This is a continuation-in-part of Ser. No. 581,397 filed Feb. 17, 1984, now abandoned.

FIELD OF INVENTION

Wettable fibers and filaments of olefin polymers.

BACKGROUND OF THE INVENTION

There are many olefin polymers which can be made into fibers and filaments. This includes polyethylene, polypropylene, polybutene, polypentene, and ethylene copolymerized with other olefinic monomers such as higher olefins. Olefin polymers are known for their hydrophobic properties; wettability of the polymers, including those in fibrous or filament form, is achieved by means of wetting agents provided in, or on, the polymers.

U.S. Pat. Nos. 3,847,676, 4,073,852, 4,307,143, 4,273,892, and 4,274,971 are believed to be representative of the closest prior art of which we are aware.

U.S. Pat. No. 4,189,420 discloses, inter alia, certain ethylene polymers blended with a polybutene and a mixed glyceride having at least one acyl group of 2 to 6 carbon atoms and at least one acyl group containing 8 to 22 carbon atoms.

U.S. Pat. No. 3,048,266 discloses, inter alia, an antifog agent of polyethylene oxide derivative in a polyolefin composition.

U.S. Pat. No. 3,048,263 discloses, inter alia, a polyolefin anti-fog agent comprising an monoglyceride of a fatty acid.

U.S. Pat. No. 2,462,331 discloses, inter alia, the incorporation into polyethylene of polyhydric alcohol esters of metal salts of either saturated or unsaturated monocarboxylic fatty acids.

Convenient references relating to fibers and filaments, including those of man-made thermoplastics, and incorporated herein by reference, are, for example:

(a) *Encyclopedia of Polymer Science and Technology*, Interscience, New York, Vol. 6 (1967) pp 505–555 and Vol. 9 (1968) pp 403–440;

(b) *Man-Made Fiber and Textile Dictionary*, published by Celanese Corporation;

(c) *Fundamentals of Fibre Formation—The Science of Fibre Spinning and Drawing*, by Andrzij Ziabicki published by John Wiley & Sons, London/New York, 1976;

(d) *Man-Made Fibres*, by R. W. Moncrieff, published by John Wiley & Sons, London/New York, 1975;

(e) *Kirk-Othmer Encyclopedia of Chemical Technology*, Vol. 16 for "Olefin Fibers", published by John Wiley & Sons, New York, 1981, 3rd Edition.

In conformity with commonly accepted vernacular or jargon of the fiber and filament industry, the following definitions apply to the terms used in this disclosure:

A "monofilament" (a.k.a. monofil) refers to an extruded individual strand of denier greater than 15, usually greater than 30;

A "fine denier fiber of filament" refers to an extruded strand of denier less than about 15;

A "multi-filament" (a.k.a. multifil) refers to simultaneously extruded fine denier filaments formed as a bundle of fibers, generally containing at least 3, preferably at least about 15–100 fibers and can be several hundred or several thousand;

"Staple fibers" refer to fine denier strands which have been formed at, or cut to, staple lengths of generally about 1 to about 8 inches;

An "extruded strand" refers to an extrudate formed by passing polymer through a forming-orifice, such as a die.

Whereas it is known that virtually any thermoplastic polymer can be extruded as a coarse strand or monofilament, many of these, such as polyethylene and some ethylene copolymers, have not generally been found to be suitable for the making of fine denier fibers or multifilaments. Practitioners are aware that it is easier to make a coarse monofilament yarn of 15 denier than to make a multi-filament yarn of 15 denier. It is also recognized that the mechanical and thermal conditions experienced by a bundle of filaments, whether in spinning staple fibers or in multi-filaments yarns, are very different to those in spinning monofilaments. The fact that a given man-made polymer can be extruded as a monofilament, does not necessarily herald its use in fine denier or multi-filament extrudates.

The present invention includes, especially, fine denier fibers and multi-filaments of the LLDPE ethylene copolymers. It is believed that U.S. Pat. Nos. 4,181,762, 4,258,097, and 4,356,220 are representative of the most relevant fiber art of which we are aware. U.S. Pat. No. 4,076,698 discloses methods of producing LLDPE polymers and discloses extrusion of a monofilament.

SUMMARY OF THE INVENTION

An olefin polymer, especially a linear low density polyethylene copolymer (LLDPE), having compounded therewith a wetting agent, is used in forming wettable fibers and/or filaments. The said wetting agent comprises at least one of the following: (1) an alkoxylated alkyl phenol along with a mixed mono-, di- and/or tri-glyceride, or (2) a polyoxyalkylene fatty acid ester, or (3) a combination of (2) and any part of (1).

DETAILED DESCRIPTIONS

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 gms/cc.

The other commercially-used technique involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone", and they are also generally known as high density polyethylene (HDPE). Linear polyethylene (HDPE) ordinarily has a density in the range of 0.941 to 0.965 gms/cc. It is this polymerization technique which is used in preparing copolymers of ethylene with other alpha-olefins.

When ethylene is copolymerized with other alpha-olefins using this technique, the effect of the comonomer is to lower the density below the HDPE range, but the polymer molecules remain of the "linear" type.

The most preferred olefin polymers of the present invention are the "linear" type ethylene copolymers wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient to cause the density of the polymer to be substantially in the same density range as LDPE, due to the alkyl sidechains on the polymer molecule, yet the polymer remains in the "linear" classification; they are conveniently referred to as "linear low density polyethylene"(LLDPE). These polymers retain much of the strength, crystallinity, and toughness normally found in HDPE homopolymers of ethylene. Other polyolefins within the purview of the present invention, though less preferred than LLDPE, include HDPE, polypropylene, and polybutenes.

The present invention comprises the use of a composition of an polyolefin resin and additives to form wettable fibers and filaments, especially those of fine denier, with high permanence of wettability. The neat polyolefins are hydrophobic materials and fibrous structures formed from neat polyolefin resins are not readily wet by water. In certain applications, such as those involving the dispersion of fibers in an aqueous medium and transport in or of an aqueous medium through an assembly of fibrous structures, this hydrophobic nature reduces the performance of polyolefin fibers. Imparting a lasting or use-variable surface wettability to polyolefin fibrous structures will improve and expand their use as filtration structures, transport membranes and reinforcing matrices.

The polymer formulations of the present invention preferably contain an amount of the surface active (wetting) agent in the range of about 0.01% to about 5%, whether it is only one of the agents, or a mixture of the agents; most preferably an amount in the range of about 0.1% to about 3% is used.

The surface active agent contemplated within the purview of the present invention, for addition to the ethylene polymer, is at least one of the following: (1) an alkoxylated alkyl phenol along with (or in combination with) a mixed mono-, di- and/or tri-glyceride, or (2) a polyoxyalkylene fatty acid ester, or (3) a combination of (2) and any part of (1) above.

Alternately stated, wettable fibers or filaments are prepared from a composition comprising an olefin polymer having incorporated therein a wetting agent, said wetting agent comprising at least one combination of:
 (a) an alkoxylated alkyl phenol along with a mixing mono-, di-, and/or triglyceride;
 (b) an alkoxylated alkyl phenol along with a polyoxyalkylene fatty acid ester;
 (c) a polyoxyalkylene fatty acid ester along with a mixed mono-, di- and/or triglyceride; or
 (d) an alkoxylated alkyl phenol along with a mixed mono-, di-, and/or triglyceride and with a polyoxyalkylene fatty acid ester.

The alkoxylated alkyl phenol is preferably one which is exemplified by the empirical formula

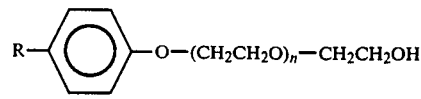

where R is an alkyl group of from 1 to 20 carbon atoms, preferably about 5 to about 15 carbon atoms, most preferably about 6 to about 12 carbon atoms; and where n is preferably a numerical value in the range of about 10 to about 55, more preferably in the range of about 10 to about 30, most preferably in the range of about 12 to about 20. It will be understood that the numerical value n may represent an average value as the length of the polyalkoxy chain can vary somewhat from molecule to molecule. A polyethoxy chain is the preferred polyalkoxy chain.

The mixed glyceride may be exemplified by the empirical formula $$\begin{array}{l} H_2C-OR_1 \\ HC-OR_2 \\ H_2C-OR_3 \end{array}$$

where $OR_1$, $OR_2$, and $OR_3$ represent, independently hydroxyl or a fatty acid ester group, but where at least one of them is a fatty acid ester. Thus, the mixed glyceride is a mono-, di-, or tri-glyceride of a fatty acid. The fatty acid may be saturated or unsaturated and is preferably a mixture of fatty acids having carbon chain lengths in the range of about 12 to about 18 carbons. Palm oil, e.g., is a convenient source of a mixture of fatty acids having carbon chain lengths within the range of about 12–18 carbons.

The preferred polyoxyalkylene fatty acid esters may be exemplified by the empirical formula $$R-(CH_2CH_2O)_n-CH_2CH_2OH$$

where R is a fatty acid ester group, which may be saturated or unsaturated, and is preferably derived from a mixture of fatty acids having carbon chain lengths in the range of about 12 to 18 carbons; and where n is preferably a numerical value in the range of about 10 to about 55, more preferably in the range of about 10 to about 30, most preferably about 12 to about 20. A polyoxyethylene chain is the preferred polyoxyalkylene chain.

The mixing of the surface active agents into the ethylene polymer is done by mixing it into molten polymer by commonly used techniques such as roll-milling, mixing in a Banbury type mixer, or mixing in an extruder barrel and the like. The heat history (time at which held at elevated temperature) can be shortened by mixing the surface active agent with unheated polymer particles so as to achieve substantially even distribution of the agent in the mass of polymer, thereby reducing the amount of time needed for intensive mixing at molten temperature.

Conveniently, the surface active agent can also be added substantially simultaneously or sequentially with any other additives (colorants, dyes, and the like) which may be desired in certain instances. The surface active agents may also be preblended with other additives and the blend then added to the polymer. It is contemplated that in some instances these surface active agents should have the additional benefit of aiding the other additives to become more easily or evenly dispersed or dissolved in the ethylene polymer. For easier batch-to-batch control of quality, it may be preferred to employ concentrated masterbatches of polymer/agent blends which are subsequently blended, as portions, to additional quantities of polymer to achieve the final desired formulation. The masterbatch, or the neat additives, may be injected into freshly prepared polymer while the polymer is still molten and after it leaves the polymerization vessel or train, and blended therewith before the molten polymer is chilled to a solid or taken to further processing. It is within the purview of the present invention to employ blends or alloys of olefin polymers, whether they be of the above described LDPE, LLDPE, HDPE or other olefin polymers or copolymers made using a free-radical initiator or a coordination catalyst. Polypropylene is an example of an olefin polymer made using a coordination catalyst (e.g. the well-known Ziegler or Natta catalysts or variations thereof) yet which inherently exhibits a low density compared to polyethylene.

The use of polyolefin fibers is a growth area in the textile and related industries. Material advantages are being recognized as economic considerations drive the replacement of more expensive synthetic and natural fibers. An area where polyolefin fibers are making inroads is the disposable diaper market. Disposable diapers currently use a nonwoven, fibrous web as the skin contact innerliner. This innerliner should join the backing to hold the diaper together, transport fluid away from the skin via a wicking mechanism and provide a comfortable skin contact surface. The materials of choice for innerliners are presently polyester and cellulose with polypropylene gaining an increasing market share. The innerliners are composed of very fine, interconnected fibers of variable lengths. Polyester innerliners wet fairly readily and wick effectively but polyester webs have a coarse feel. Cellulose wets but also absorbs and retains water. Polypropylene provides a much softer web than polyester but it wets poorly, thus requires an added surface active agent. This limits the rate and efficiency of fluid transport due to the difficulty of forcing the fluid into the capillary matrix of the innerliners.

Linear low density polyethylene (LLDPE) fibers exhibit enhanced tactile properties such as softness compared to polypropylene and high density polyethylene. Melt blending linear low resins with a combination of surface active agents and melt spinning the blend produces wettable fibers with tactile properties superior to fibers of barefoot (neat) linear low density polyethylene resins. Webs of the wettable linear low polyethylene fibers exhibit rapid wetting and transport of aqueous media through the fiber matrix. These fibrous structures demonstrate good performance potential and offer a means for opening new markets of olefin polymers.

Wettability is a surface phenomena involving minimization of the interfacial surface energies between adjacent solid and liquid phases. In the case of water and polyolefins, wettability generally requires altering the polymer surface. This may be accomplished via a copolymer composition or by the action of auxiliary surfactants. Copolymers often detract from polyolefin material properties, add expense and make processing more difficult. Surface active agents are generally mobile species which aggregate as an interfacial compatibilizing layer on the polymer surface. The mobility of the surface layer makes it susceptible to solvation and mechanical dispersion. In other cases, where the surface active agents possess a strong affinity for the polyolefin substrate, fiber properties may deteriorate due to plasticization and/or detrimental structural rearrangements. Surfactants generally require an additional process step for application or activation and, in prior art, are often added after forming the fibrous or fabric product.

The present invention includes embodiments of a synergistic combination of surface active species, compounded directly with the resin, in contradistinction to post-added agents. The compounded resin is fabricated by conventional processes and the wetting property is present in the product as fabricated. The resin in the present invention is easily processed and shows no detrimental change in properties. A broad range of wetting characteristics such as degree of wetting and permanence may be obtained by varying concentrations and composition of the additive package through the range of desired synergistic behavior. Resistance to solvation and mechanical dispersion is controlled by providing at least one surface active species that remains partially embedded in the substrate matrix while simultaneously participating in the interfacial zone.

This invention differs from the prior art by incorporating surface active agents directly into the bulk polymer resin rather than introducing a copolymer or applying a surface treatment to fabricated fibrous structures. The surface active agents bloom to the fabricated fiber surfaces where at least one of the surface active agents remain partially embedded in the polymer matrix. The permanence of wettability can be controlled through composition and concentration of the additive package. The more mobile components in the additive package can be designed to serve secondary functions such as skin conditioners or process aids.

The preferred blends of the present invention comprise about 95% to about 99.9% of the olefin polymer, the remainder being the wetting agent (or mixture of wetting agents as described in this disclosure), excluding any consideration of the weight of other additives (e.g. pigments, colorants, fillers, etc.) that may comprise a portion of the total final blend.

The following examples illustrate particular embodiments of the present invention, but the invention is not limited to the particular embodiments shown.

EXAMPLE 1

An ethylene/1-octene copolymer with 2.5 MI and 0.935 g/cc density was melt blended with 1% by weight of the wetting agent package. The package contained a combination of an ethoxylated alkyl phenol with 14 units of ethylene oxide and a mixed glyceride with $C_{12}-C_{16}$ fatty acid adduct (sold under the tradename Atmer 685). Fine filaments were spun at 250° C. using an Instron capillary rheometer. The filaments were attenuated and collected with a variable speed roll. Wettability was compared to and examined along with filaments spun from the barefoot (uncombined) resin using the same spinning conditions; sets of four of each sample were tested.

Wetting Test No. 1

Continuous filaments were wrapped around a metal support frame to form a flat, quasi-continuous surface. Droplets of deionized water were placed on the wrapped filament surfaces. The contact angles of the D.I. water droplets were measured on a Kayeness contact angle viewer with the results shown in Table I. The barefoot resin filament surface exhibited obtuse contact angles indicating a non-wetting surface. The resin plus additive filament surface wet immediately, resulting in contact angles less than 1°. The D.I. water on this surface passed through the adjacent filament interfaces.

Wetting Test No. 2

Filaments from each resin sample were cut into short fibers and assembled into pseudo-nonwoven mats. D.I. water droplets were applied to the mat surfaces and visually observed (viewed without aid). Results are shown in Table I. Obtuse contact angles were again observed on the barefoot resin samples. Droplets remained on the surface until air dried. Sample mats made from the resin with the additive wetted instantly, allowing the water to migrate beneath the web structure. No surface water was visible.

EXAMPLE 2

An ethylene/1-octene copolymer with 2.0 MI and 0.925 density was melt blended with 1% by weight of the same additive package used in Example 1. Fine filaments were spun at 220° C. using the same equipment as in Example 1. Wettability was determined by Wetting Test No. 2. Permanence of wetting against abrasion was examined with two abrasion tests.

Abrasion Test No. 1

Rub small filament bundles twenty times between layers of a cellulosic laboratory wipe. Apply D.I. water droplets to the abraded bundle, time the penetration of water through the structure and note surface water.

Abrasion Test No. 2

Rub small filament bundles twenty times between closed fingers of a bare hand. Apply D.I. water droplets to the abraded bundle, time the penetration of the water into the structure and note surface water.

Results for Example 2 are shown in Table II.

EXAMPLE 3

An ethylene/1-octene copolymer with 2.3 MI and 0.917 g/cc density was melt blended with 1% by weight of the same additive package used in Example 1. Filaments were spun as in Example 2. Wetting performance was tested by Wetting Test No. 2 and Abrasion Tests No. 1 and 2 (see Table II under Example 3 for results).

EXAMPLE 4

An ethylene/1-octene copolymer with 2.3 MI and 0.917 g/cc density was melt blended with 0.5% by weight of the additive package of Example 1. Filaments were spun and tested as in Example 3 (see Table II under Example 4 for results).

EXAMPLE 5

An ethylene/1-octene copolymer with 2.3 MI and 0.917 g/cc density was melt blended with 0.25% by weight of the additive package of Example 1. Filaments were spun and tested as in Example 3 (see Table II under Example 5 for results).

EXAMPLE 6

An ethylene/1-octene copolymer with 2.3 MI and 0.917 g/cc density was melt blended with 1% by weight of an additive package consisting of an ethoxylated alkyl phenol with less than 14 units of ethylene oxide and a mixed glyceride with $C_{12}$–$C_{16}$ fatty acid adduct (sold under the tradename Atmer 645). Filaments were spun and tested as in Example 3 (see Table II for results under Example 6).

EXAMPLE 7

An ethylene/1-octene copolymer with 2.3 MI and 0.917 g/cc density was melt blended with 1% by weight of a wetting agent consisting of mono- and diglycerides (sold under the tradename of Atmos 300). Filaments were spun and tested as in Example 3 (see Table II under Example 7 for results).

EXAMPLE 8

An ethylene/1-octene copolymer with 2.3 MI and 0.917 g/cc density was melt blended with 1% by weight of a mono- and diglyceride mixture and 0.4% by weight of a nonylphenoxy poly(ethyleneoxy)ethanol (9 moles ethylene oxide). Filaments were spun and tested as in Example 3 (see Table II under Example 8 for results).

EXAMPLE 9

An ethylene/1-octene copolymer with 2.3 MI and 0.917 g/cc density was melt blended with 1% by weight of a wetting agent, polyoxyethylene laurate (sold by C. P. Hall Chemical Company under the tradename CPH 376-N). Filaments were spun and tested as in Example 3 (see Table II under Example 9 for results).

EXAMPLE 10

An ethylene/1-octene copolymer with 2.3 MI and 0.917 g/cc density was melt blended with 1% by weight of a wetting agent, nonylphenoxypoly(ethyleneoxy)ethanol, 20 moles ethylene oxide. Filaments were spun and tested as in Example 3 (see Table II under Example 10 for results).

EXAMPLE 11

An ethylene/1-octene copolymer with 2.3 MI and 0.917 g/cc density was melt blended with 1% by weight of a wetting agent, nonylphenoxypoly(ethyleneoxy)ethanol (30 moles ethylene oxide). Filaments were spun and tested as in Example 3 (see Table II for results, under Example 11).

EXAMPLE 12

An ethylene/1-octene copolymer with 2.3 MI and 0.917 g/cc density was melt blended with an additive package to give 0.5% by weight of mono-and diglycerides and 0.5% by weight of nonylphenoxypoly(ethyleneoxy)ethanol (20 moles ethylene oxide). Filaments were spun and tested as in Example 3 (see Table II for results, under Example 12).

EXAMPLE 13

An ethylene/1-octene copolymer with 2.3 MI and 0.917 g/cc density was melt blended with an additive package to give 0.5% by weight of mono-and diglycerides and 0.5% by weight of nonylphenoxypoly(ethyleneoxy)ethanol (30 moles ethylene oxide). Filaments were spun and tested as in Example 3 (see Table II for results, under Example 13).

EXAMPLE 14

An ethylene/1-octene copolymer with 2.3 MI and 0.917 g/cc density was melt blended with 1% by weight of an ethoxylated mono-and diglyceride and sold under the tradename Sherex LI-42. Filaments were spun and tested as in Example 3 (see results in Table II, under Example 14).

EXAMPLE 15

The filaments from the blended resin of Example 3 were soaked in 1N HCl and 1% NH4OH for 24 hours. The filaments were then rinsed thoroughly in D.I. H2O and air dryed overnight. The filaments wetted completely within one second when droplets of D.I. water were applied to the bundle surface.

EXAMPLE 16

An ethylene/1-octene copolymer with 6.0 MI and 0.919 g/cc density was melt blended with 1% by weight of the additive package of Example 1. A continuous filament bundle was produced using a screw extruder to feed a melt gear pump and spinnerette pack. The filament bundle was air quenched and collected by mechanical wind up at 1000–1500 m/min. Also some of the filament bundle was collected by air laydown into a screen in a random web. The as-spun filaments showed instant wetting by water as judged by Wetting Test No. 2. One-inch staple fibers, cut from these filaments, were processed into nonwoven webs on a card, a Garnett, and a Rando-Webber. These nonwoven webs exhibited instant aqueous wetting as judged by Wetting Test No. 2.

TABLE I

| Sample | Data for Example 1 | |
|---|---|---|
| | Wetting Test No. 1 | Wetting Test No. 2 |
| Barefoot Resin | Obtuse Contact Angle 100° | Obtuse Contact Angle |
| Barefoot Resin | Obtuse Contact Angle 137° | Obtuse Contact Angle |
| Barefoot Resin | Obtuse Contact Angle 130° | Obtuse Contact Angle |
| Barefoot Resin | Obtuse Contact Angle 138° | Obtuse Contact Angle |
| Resin & Additive | <1° Contact Angle, Instantly Wet | Sorbed, Wet Instantly |
| Resin & Additive | <1° Contact Angle, Instantly Wet | Sorbed, Wet Instantly |
| Resin & Additive | <1° Contact Angle, Instantly Wet | Sorbed, Wet Instantly |
| Resin & Additive | <1° Contact Angle, Instantly Wet | Sorbed, Wet Instantly |

TABLE II

| Example No. | Wetting Test No. 2 | Abrasion Test No. 1 | Abrasion Test No. 2 |
|---|---|---|---|
| 2 | Sorbed, Wet Instantly | Wet Instantly, Completely | Wet Instantly, Completely |
| 3 | Sorbed, Wet Instantly | Wet Instantly, Completely | Wet Instantly, Completely |
| 4 | Sorbed, Wet Instantly | Wet Instantly, Completely | Wet Instantly, Completely |
| 5 | Wet Slowly, >1 min. | <1 min., Completely | <10 sec., Completely |
| 6 | Sorbed, Wet Instantly | Wet Instantly, Completely | Wet Instantly, Completely |
| 7 | ~1 sec., Surface Layer | <3 sec., Surface Layer | <5 sec., Surface Layer |
| 8 | <2 sec., Surface Layer | ~5 sec., Surface Layer | ~5 sec., Surface Layer |
| 9 | Sorbed, Wet Instantly | Wet Instantly, Completely | Wet Instantly, Completely |
| 10 | >10 sec., Surface Layer | >2 min., No Wetting | >2 min., No Wetting |
| 11 | No Wetting | >2 min., No Wetting | >2 min., No Wetting |
| 12 | Sorbed, Wet Instantly | Wet Instantly, Completely | Wet Instantly, Completely |
| 13 | Sorbed, Wet Instantly | Wet Instantly, Completely | Wet Instantly, Completely |
| 14 | No Wetting | >2 min., No Wetting | >2 min., No Wetting |

The wettable fibers of the present invention may form a useful part, or comprise the majority portion, of end products such as diaper innerliners, battery cell separators, filters, paper reinforcing matrix, separation membranes, moisture permeable diaphragms, and construction material reinforcing matrix. The present fibers are also useful as a blend component for other fibers whereby the thermoplasticity properties as well as the wettability of the fibers are found to be advantageous.

We claim:

1. Wettable fibers or filaments prepared from a composition comprising an olefin polymer having incorporated therein a wetting agent, said wetting agent comprising at least one of (a) an alkoxylated alkyl phenol along with, or in combination with, a mixed mono-, di- and/or tri-glyceride, or (b) a polyoxyalkylene fatty acid ester, or (c) a combination of (b) and any part of (a).

2. The fibers or filaments of claim 1 wherein the alkoxylated alkyl phenol is exemplified by the empirical formula

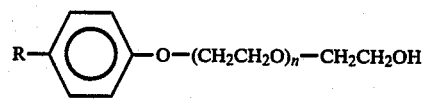

where R is an alkyl group of from 1 to 20 carbon atoms, and where n is a numerical value in the range of about 10 to about 55.

3. The fibers or filaments of claim 1 wherein the mixed glyceride is exemplified by the empirical formula

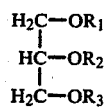

where $OR_1$, $OR_2$, and $OR_3$ represent, independently hydroxyl or a fatty acid ester group, but where at least one of them is a fatty acid ester.

4. The fibers or filaments of claim 1 wherein the polyoxyalkylene fatty acid ester is exemplified by the empirical formula

where R is a fatty acid ester group, either saturated or unsaturated, and where n is a numerical value in the range of about 10 to about 55.

5. The fibers or filaments of claim 1 wherein the olefin polymer is LLDPE.

6. The fibers or filaments of claim 1 wherein the olefin polymer is LDPE.

7. The fibers or filaments of claim 1 wherein the olefin polymer is HDPE.

8. The fibers or filaments of claim 1 wherein the olefin polymer is polypropylene.

9. The fibers or filaments of claim 1 wherein the olefin polymer is polybutene.

10. The fibers or filaments of claim 1 wherein the olefin polymer is a copolymer of ethylene and at least one alpha-olefin having $C_3$-$C_{12}$ carbon atoms.

11. The fibers or filaments of claim 1 wherein the wetting agent is present in an amount of about 0.01% to about 5% by weight.

12. The fibers or filaments of claim 1 wherein the wetting agent is present in an amount of 0.1% to about 3% by weight.

13. The fibers or filaments of claim 1 wherein the wetting agent comprises the composition of (a).

14. The fibers or filaments of claim 1 wherein the wetting agent comprises the composition of (b).

15. The fibers or filaments of claim 1 wherein the wetting agent comprises a combination of (c).

16. The fibers or filaments of claim 1 wherein the wetting agent comprises a polyoxyalkylene fatty acid ester in combination with an alkoxylated alkyl phenol.

17. The fibers or filaments of claim 1 wherein the wetting agent comprises a polyoxyalkylene fatty acid ester in combination with a mixed mono-, di-, and/or triglyceride.

18. The fibers or filaments of claim 1 wherein the fibers or filaments comprise a woven fabric.

19. The fibers or filaments of claim 1 wherein the fibers or filaments comprise a non-woven fabric.

20. The fibers or filaments of claim 1 wherein the fibers or filaments comprise a knitted fabric.

21. The fibers or filaments of claim 1 wherein the olefin polymer is an interpolymer of ethylene and two or more alpha-olefins having $C_3$-$C_{12}$ carbon atoms.

22. The fibers or filaments of claim 1 when combined with other fibers, thereby imparting thermoplasticity and wettability properties to the whole.

23. The fibers or filaments of claim 1 when employed as a wettable portion of products of the group comprising diaper products, battery cell separators, filters, papers, membranes, diaphragms, and construction materials.

24. The fibers or filaments of claim 1 in the form of a dispersion in an aqueous medium.

25. The fibers or filaments of claim 1 of a fine denier size.

26. Wettable fibers or fine filaments prepared from a composition comprising an olefin polymer having incorporated therein a wetting agent, said wetting agent comprising at least one combination of:
(a) an alkoxylated alkyl phenol along with a mixed mono-, di-, and/or triglyceride;
(b) an alkoxylated alkyl phenol along with a polyoxyalkylene fatty acid ester;
(c) a polyoxyalkylene fatty acid ester along with a mixed mono-, di- and/or triglyceride; or
(d) an alkoxylated alkyl phenol along with a mixed mono-, di-, and/or triglyceride and with a polyoxyalkylene fatty acid ester.

27. The wettable fibers or fine filaments of claim 26 wherein the alkoxylated alkyl phenol is exemplified by the empirical formula

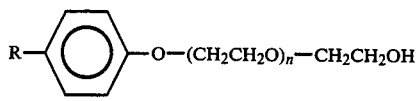

where R is an alkyl group of from 1 to 20 carbon atoms, and where n is a numerical value in the range of about 10 to about 55.

28. The wettable fibers or fine filaments of claim 26 wherein the mixed glyceride is exemplified by the empirical formula

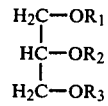

where $OR_1$, $OR_2$, and $OR_3$ represent, independently hydroxyl or a fatty acid ester group, but where at least one of them is a fatty acid ester.

29. The wettable fibers or fine filaments of claim 26 wherein the polyoxyalkylene fatty acid ester is exemplified by the empirical formula

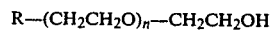

where R is a fatty acid ester group, either saturated or unsaturated, and where n is a numerical value in the range of about 10 to about 55.

30. The wettable fibers or fine filaments of claim 26 wherein the olefin polymer is LLDPE.

31. The wettable fibers or fine filaments of claim 26 wherein the olefin polymer is LDPE.

32. The wettable fibers or fine filaments of claim 26 wherein the olefin polymer is HDPE.

33. The wettable fibers or fine filaments of claim 26 wherein the olefin polymer is polypropylene.

34. The wettable fibers or fine filaments of claim 26 wherein the olefin polymer is polybutene.

35. The wettable fibers or fine filaments of claim 26 wherein the olefin polymer is a copolymer of ethylene and at least one alpha-olefin having $C_3$-$C_{12}$ carbon atoms.

36. The wettable fibers or fine filaments of claim 26 wherein the olefin polymer is a blend or alloy of olefin polymers wherein at least one of said polymers is selected from the group comprising LLDPE, LDPE, HDPE, polypropylene, and polybutene.

37. The wettable fibers or fine filaments of claim 26 wherein the wetting agent is present in an amount of about 0.01% to about 5% by weight.

38. The wettable fibers or fine filaments of claim 26 wherein the wetting agent is present in an amount of 0.1% to about 3% by weight.

39. The wettable fibers or fine filaments of claim 26 wherein the wetting agent comprises the composition of combination (a).

40. The wettable fibers or fine filaments of claim 26 wherein the wetting agent comprises the composition of combination (b).

41. The wettable fibers or fine filaments of claim 26 wherein the wetting agent comprises the composition of combination (c).

42. The wettable fibers or fine filaments of claim 26 wherein the wetting agent comprises the composition of combination (d).

43. The wettable fibers or fine filaments of claim 26 wherein the fibers or filaments comprise a woven fabric.

44. The wettable fibers or fine filaments of claim 26 wherein the fibers or filaments comprise a non-woven fabric.

45. The wettable fibers or fine filaments of claim 26 wherein the fibers or filaments comprise a knitted fabric.

46. The wettable fibers or fine filaments of claim 26 wherein the olefin polymer is an interpolymer of ethylene and two or more alpha-olefins having $C_3$–$C_{12}$ carbon atoms.

47. The wettable fibers or fine filaments of claim 26 when combined with other fibers, thereby imparting thermoplasticity and wettability properties to the whole.

48. The wettable fibers or fine filaments of claim 26 when employed as a wettable portion of products of the group comprising diaper products, battery cell separators, filters, papers, membranes, diaphragms, and construction materials.

49. The wettable fibers or fine filaments of claim 26 in the form of a dispersion in an aqueous medium.

* * * * *

UNITED STATES PATENT AND TRADEMARK OFFICE
CERTIFICATE OF CORRECTION

PATENT NO.  : 4,578,414

DATED       : March 25, 1986

INVENTOR(S) : Lawrence H. Sawyer and George W. Knight

It is certified that error appears in the above-identified patent and that said Letters Patent is hereby corrected as shown below:

Col. 1, line 35; correct "an" to --a--.

Col. 1, line 39; correct "of" to --or--.

Col. 5, line 55; correct "of" to --for--.

Signed and Sealed this

Twenty-eighth Day of October, 1986

[SEAL]

Attest:

DONALD J. QUIGG

Attesting Officer          Commissioner of Patents and Trademarks